(No Model.)

A. W. THOMAS.
WHEEL TIRE.

No. 399,357. Patented Mar. 12, 1889.

WITNESSES:
Hermann Bormann.
W. A. Whitmore.

INVENTOR:
Amos W. Thomas.
By J. Walter Douglas.
ATT'Y.

UNITED STATES PATENT OFFICE.

AMOS W. THOMAS, OF PHILADELPHIA, PENNSYLVANIA.

WHEEL-TIRE.

SPECIFICATION forming part of Letters Patent No. 399,357, dated March 12, 1889.

Application filed June 30, 1888. Serial No. 278,642. (No model.)

*To all whom it may concern:*

Be it known that I, AMOS W. THOMAS, a citizen of the United States, residing at the city of Philadelphia, in the county of Philadelphia and State of Pennsylvania, have invented certain new and useful Improvements in Tires for the Wheels of Vehicles, of which the following is a specification.

My invention relates to a class of tires formed of elastic or compressible material, and such as are capable of being inflated through the medium of air, gas, water, or other fluids or liquids.

The principal object of my present invention is to provide an inflatable tire made from a sheet of flexible material impervious to liquids or fluids, and such as may be used to assume a cylindrical form in its engagement with a curved or angular felly provided with grooves, slits, recesses, or sunken channels in the sides or edges thereof and caused to maintain said form after inflation, whereby a very strong, durable, and serviceable tire is presented especially adapted for use in connection with the road-wheels of bicycles, tricycles, velocipedes, and other rolling conveyances.

The characteristic features of my invention will be more fully understood by reference to the accompanying drawings, forming part hereof, in which—

Figure 1:
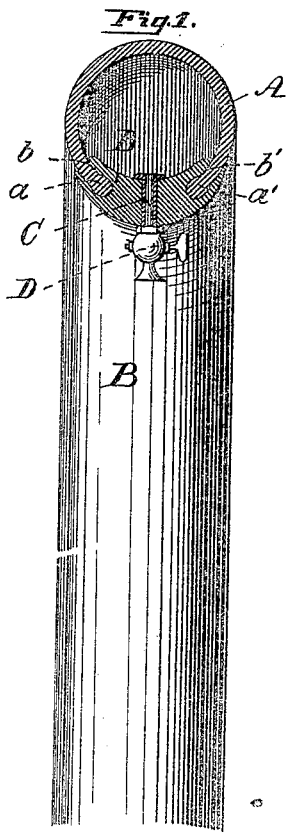
Figure 2:
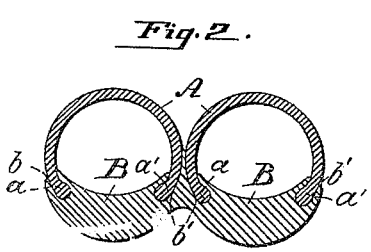

Figure 1 is a transverse sectional view of a tire embodying the features of my invention as applied to a groove-faced metal felly of the type generally employed in bicycles, and the said felly with countersunk grooves in the sides or edges thereof being shown partly in section and partly in elevation; and Fig. 2 is a transverse sectional view of a duplex tire in connection with a felly and embodying as so combined the features of my invention.

Referring to the drawings for a further description of my invention, A is the tire, made of a sheet of rubber or other flexible or elastic material, which, by suitable treatment in the course of its manufacture, renders it impervious to fluids or liquids. The sides $a$ and $a'$ of the rectangular sheet of rubber or other somewhat analogous material is thickened to form enlargements thereat to engage in the countersunk grooves, channels, or recesses $b$ and $b'$ of the felly B, made of metal or other suitable material. These channels or grooves extend into the body of the felly some distance on each side of the center thereof in order that the enlargements on each side of the flexible sheet forming the hollow tire may be firmly fitted to place and held therein by means of cement or other glutinous or adhesive material. Into the surface of the felly B is provided an opening, through which extends a tube, C, provided with a stop-cock, D, for inflating the hollow impervious or fluid-tight cylindriform flexible tire A. The degree of compressibility of the tire may be regulated by the degree of inflation, which may be introduced under pressure.

The tire may be made of other material besides rubber; but I give preference to the use of rubber for the formation of same. The felly may be made of wood, but I prefer metal.

The tire may be made in a duplex form, as shown in Fig. 2, if a broader tread is desired. Furthermore, the enlargements in the sides of the sheet of flexible materials may be retained firmly in the grooves of the felly B by pins, rivets, bolts, or other suitable fastenings.

The principal advantage incident to the use of an inflatable tire composed of flexible material and secured into the grooves of an angular felly substantially in the manner described is that a very durable and securely-held tire is presented, especially suited for the road-wheels of bicycles and other rolling conveyances to insure ease of movement in the passage of the wheels over rugged or stony roadways.

Having thus described the nature and objects of my invention, what I claim as new, and desire to secure by Letters Patent, is—

1. An inflatable tire composed of a sheet of flexible material, having the sides thereof enlarged and firmly held in grooves or countersunk channels formed in the sides or edges of a felly, substantially as described.

2. An inflatable tire composed of flexible material, having the sides enlarged, in combination with a felly having grooves or channels in the sides or edges thereof to receive the enlargements of the tire, and a tube with a cock secured into said felly, substantially as and for the purposes set forth.

3. An inflatable tire composed of flexible material, having enlarged sides or edges which engage in the grooves of a duplex felly, and means, substantially as described, for firmly holding said tire in position therein, substantially as and for the purposes set forth.

In witness whereof I have hereunto set my signature in the presence of two subscribing witnesses.

AMOS W. THOMAS.

Witnesses:
W. A. WHITMORE,
GEO. W. REED.